Sept. 16, 1941.   M. HAHN   2,256,198
AIRCRAFT POWER PLANT
Filed May 31, 1939   2 Sheets-Sheet 1

Inventor:
Max Hahn
By: Haseltine, Lake & Co.
Attorneys

Sept. 16, 1941.   M. HAHN   2,256,198
AIRCRAFT POWER PLANT
Filed May 31, 1939   2 Sheets-Sheet 2

Inventor
Max Hahn
By:- Haseltine, Lake & Co.
Attorneys

Patented Sept. 16, 1941

2,256,198

UNITED STATES PATENT OFFICE 2,256,198

AIRCRAFT POWER PLANT

Max Hahn, Seestadt Rostock, Germany, assignor to Ernst Heinkel, Warnemunde, Germany Application May 31, 1939, Serial No. 276,572
In Germany May 27, 1938

6 Claims. (Cl. 60—35.6)

The invention relates to a power plant, especially a propulsion unit of aircraft, due to the reaction or rocket effect, with an air compressor, a combustion plant and a gas turbine driving the compressor.

Object of the invention is to provide a driving apparatus of little weight, which is compact and in which difficulties for journalling are avoided.

A further object of the invention is to provide an apparatus which is especially adapted for fast aircraft.

A further object of the invention is to reduce the frontal face of the apparatus and thereby its resistance against the flow of air by a suitable location of the combustion chamber. This feature is of great importance for manufacturing very fast aircraft.

A further object of the invention is to branch part of the air compressed by the compressor and to mix this branched air with the combustion gases of high temperature leaving the combustion chamber and thereby obtaining a low temperature at the entrance of the turbine, a good efficiency of the combustion in the combustion chamber being maintained.

A further object of the invention is to form parts of the combustion chamber detachable for the access to the interior of the combustion chamber, especially to the nozzles of the burners to interchange them.

Further features of the invention will be given in the following description and the drawings.

Figure 1:
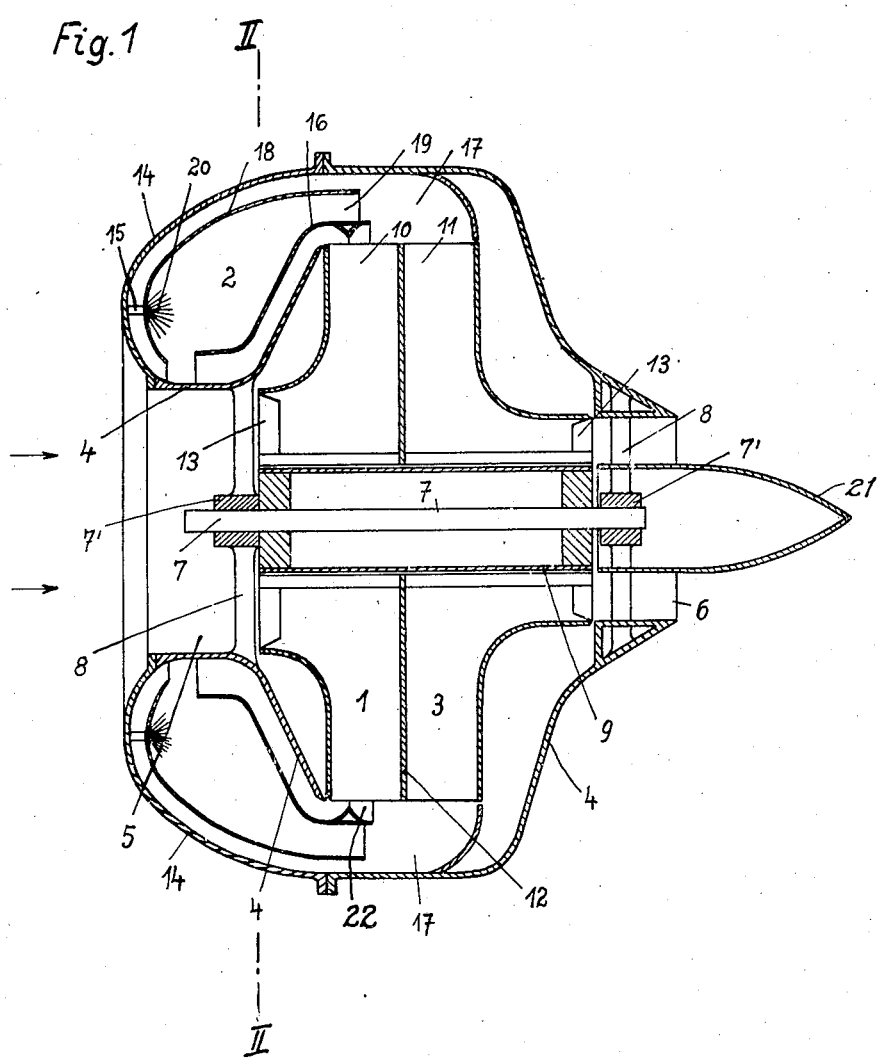
Fig. 1 is a longitudinal section of the apparatus.
Figure 2:
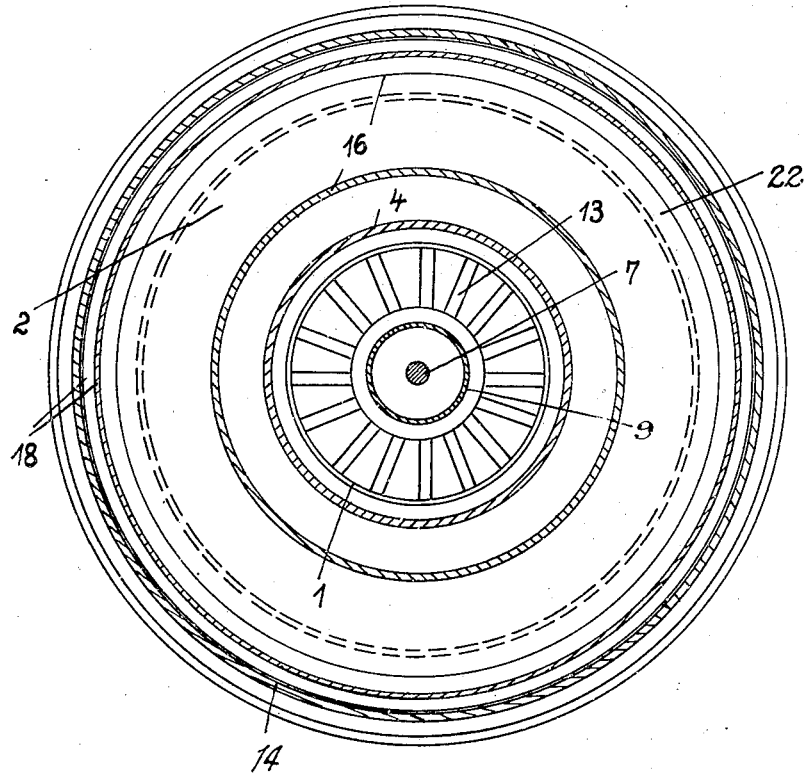
Fig. 2 is a vertical section according to the line II—II of Fig. 1.

Referring to the drawings, 1 designates the blower, 2 the combustion chamber and 3 the turbine. The blower 1 and the turbine 3 are encased in a common housing 4, provided with an inlet aperture 5 and an outlet aperture 6. The blower 1 and the turbine 3 are arranged upon a shaft 7, rotatably mounted in bearings 7'. The bearings 7' are in turn supported by brackets 8, 8 which are attached to the housing 4 in the inlet aperture 5 and the outlet aperture 6. The blower 1 and the turbine 3 are not arranged directly upon the shaft 7, but upon a tube 9 held at some distance from but firmly connected to the shaft 7. Both the blower 1 and the turbine 3 possess a plurality of vanes 10, 11 arranged radially upon the tube 9, said vanes being separated from one another by a partition wall 12 attached to the tube 9, so as to form a plurality of chambers constituting U-shaped guides for the flow medium. Both at the inlet aperture of the blower as well as at the outlet aperture of the turbine the vanes 10 and 11 are bent off at 13. At the outlet aperture 6 is provided a flow element 21 which is intended to prevent the formation of eddies.

The housing 4 encasing the blower 1 and the turbine 3 carries at its front end the annular combustion chamber 2, a substantial portion of which, in the example illustrated, is constituted by a simple shell 14 which is flanged on to the housing 4 and in which fuel inlets 15 are arranged. Within the combustion chamber 2, a guide vane 16 spaced from the front portion of the housing 4 is also provided, said guide vane being adapted to guide a portion of the air conveyed by the blower as combustion air into the combustion chamber 2 and thence to the intermediate mixing chamber 17.

The guide vane 16 overlaps in a certain distance the radial outlet aperture of the compressor and is furnished at its inside with an annular air scoop with triangular cross section; that part is indicated by the reference number 22.

Spaced from the shell 14 which constitutes the outer wall of the combustion chamber 2, a further dish-shaped guide vane 18 is provided which, together with the guide vane 16, forms an annular channel 19 leading out of the combustion chamber 2. The distance between the guide vane 18 and the shell 14 is in this case smaller than the distance between the guide vane 16 and the front portion of the housing 4. The dish-shaped guide vanes 16 and 19 consist preferably of thin sheet metal having high heat-resistance whilst the remaining parts of the apparatus insofar as they are exposed to stresses, preferably consist of high-quality steel. Within the combustion chamber 2 numerous burners 20 conveniently distributed uniformly over the entire periphery of the combustion chamber 2 are provided. At the outlet end of the apparatus a flow element 21 of stream-lined form is provided.

The apparatus of the invention operates as follows:

The fuel, e. g. gasoline, is ignited at 20 by the burners distributed over the entire periphery of the combustion chamber 2. The blower 1 and turbine 2 are started in suitable manner familiar to the man skilled in the art, e. g. by means of compressed air. When the blower and the turbine are rotating, air is sucked by the blower 1 through the entrance opening 5 in an axial direction and this air is compressed. The compressed air is discharged in a radial direction from the outlets of the blower 1 into the intermediate mixing chamber 17. A portion of the compressed air is fed into the branch line terminating at the periphery of the blower 1 and this air is led through the passage formed by the guide vanes 16 and part of the walls of the housing 4. A portion of this branched air is discharged into the combustion chamber 2 and serves for completely burning the fuel fed by the fuel inlets 15. The rest part of the branched air flows between the walls 14 and 18 and is fed back to the intermediate mixing chamber 17. The hot combustion gases produced in the combustion chamber 2 leave the combustion chamber 2 through the ring channel 19 into the intermediate mixing chamber 17; in this chamber they are partly mixed with the colder air streams surrounding this hot stream inwardly and outwardly in the intermediate mixing chamber 17. Then this mixture of combustion gases and compressed air flows into the inlet openings of the radial turbine 3 and part of the energy of the gases and compressed air is absorbed in this turbine. Then the gases leave the radial turbine in an axial direction through the outlet end 6 of the apparatus.

The portion of the cold air conveyed by the blower 1 and guided by the guide vane 16 towards the front side of the apparatus cools both the portion of the housing wall which is located within the combustion chamber 2 as well as the dish-shaped external wall 14 of the combustion chamber 2 and the dish-shaped guide vanes 16 and 18.

The cold air conveyed by the blower 1 into the mixing chamber 17 is there driven outwardly owing to its gravity. Due to the fact that the hot gas of the combustion chamber entering through the passage 19 into the intermediate mixing chamber is forced through the cold air in the intermediate mixing chamber 17 a very intensive mixing of the cold air and hot gas is effected, special mixing devices not being necessary. The resultant mixture of air and combustion gases drives the turbine 3 and after passing through the turbine 3 leaves the apparatus with a certain content of energy, such that it produces a reaction force.

The energy which, by means of the blower is imparted to the flowing medium, e. g. the air which flows in, is increased by the amount of energy of the fuel introduced, so that a considerably increased energy is available for driving the turbine and for generating a reaction force.

What I claim is:

1. In an aircraft power plant operating by the effect of reaction, a housing, a channel in the housing for introducing air and a channel for discharging gas, a bearing connected to the housing and disposed in the entrance channel, another bearing connected to the housing and disposed in the discharge channel, a rotor journalled in the bearings and comprising a one-step compressor and a one-step turbine, entrance openings being provided in the compressor adjacent to the entrance channel of the housing and discharge openings being provided in the turbine adjacent to the discharge channel of said housing, said compressor having outlet ports and said turbine having inlet ports the compressor also having vanes arranged in meridian sections and simultaneously arranged axially for introducing the air and radially for the discharge of the air, the turbine likewise having vanes arranged in meridian sections and simultaneously arranged radially for the introduction of the gas and axially for the discharge of the gas and a ring-shaped combustion chamber connecting the outlet port of the compressor and the inlet port of the turbine, the said combustion chamber being arranged at the frontal surface of the housing coaxially around the entrance channel for the air.

2. An aircraft power plant according to claim 1, in which the ring-shaped combustion chamber consists of a pressure-tight housing and heat resistant inner walls, which form an air-channel between the housing and the combustion chamber.

3. An aircraft power plant according to claim 1, in which the ring-shaped combustion chamber consists of a pressure-tight housing and heat resistant inner walls, said walls forming an air-channel between the housing and the combustion chamber, said air channel having a ring shaped discharging opening arranged on the inner diameter of the combustion chamber and serving for discharging combustion air into the said combustion chamber.

4. An aircraft power plant according to claim 1, in which the ring-shaped combustion chamber consists of a pressure-tight housing and heat resistant inner walls, which form an air-channel between the housing and the combustion chamber, part of the wall overlapping the discharge opening of the compressor and having means for branching off a portion of the air emerging from the compressor.

5. An aircraft power plant according to claim 1, in which the ring-shaped combustion chamber consists at least of two stationary parts, one of which forms a front part and is detachable.

6. An aircraft power plant according to claim 1, in which the ring-shaped combustion chamber consists of a pressure-tight housing and heat resistant inner walls, which form an air channel between the housing and the combustion chamber, part of the wall over-lapping the discharge opening of the compressor and having means for branching off part of the air emerging from the compressor, said air channel having a ring-shaped discharging opening arranged on the inner diameter of the combustion chamber for discharging combustion air in the combustion chamber, and said combustion chamber consisting at least of two stationary parts, one of which forms a front part and is detachable.

MAX HAHN.